J. F. HJORT.
LOCK WASHER.
APPLICATION FILED MAR. 5, 1913.
1,197,738. Patented Sept. 12, 1916.
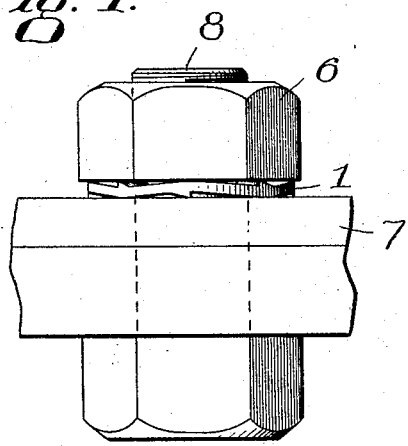
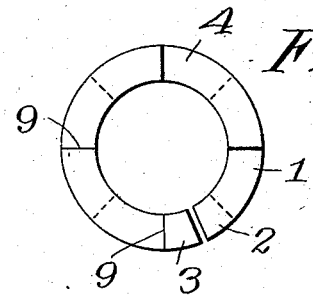
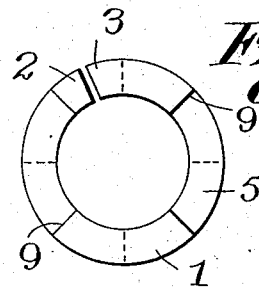
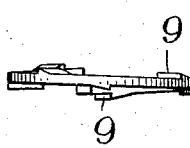
Witnesses.
R. D. Tolman.
Penelope Cumberbach.
Inventor
John F. Hjort.
By Ralph E. Atherton.
Attorney

UNITED STATES PATENT OFFICE.

JOHN F. HJORT, OF WORCESTER, MASSACHUSETTS.

LOCK-WASHER.

1,197,738.  Specification of Letters Patent.  Patented Sept. 12, 1916.

Application filed March 5, 1913. Serial No. 752,006.

*To all whom it may concern:*

Be it known that I, JOHN F. HJORT, a citizen of the United States, residing at Worcester, in the county of Worcester and Commonwealth of Massachusetts, have invented a new and useful Improvement in Lock-Washers, of which the following, together with the accompanying drawing, is a specification.

My invention relates to lock washers, one of its objects being to provide an improved form of washer which shall effectually prevent the loosening of a nut which has been firmly seated thereupon.

Other objects are to provide a form of washer which shall be efficient for the purposes for which it is intended and which at the same time shall be simple in construction and, therefore, one which may be easily and cheaply manufactured.

The invention is illustrated in the accompanying drawing, in which—

Figure 1 is a view showing one of my washers in locking position under a nut; Fig. 2 is an edge view of one of the washers after being placed under the nut; and Figs. 3 and 4 are views of the opposite faces of the washer.

Like reference characters refer to similar parts in the different figures.

The washer 1 is in the form of a split ring, the two ends 2 and 3 of the washer at the point where it has been split being forced out of alinement in a direction parallel to the axis of the washer so that the washer assumes approximately the form of one convolution of a helix. Each of the faces 4 and 5 of the washer is provided with means for engaging the contacting surfaces of the nut 6 and the object 7 through which the bolt 8 is passed, these means being preferably in the form of sharp teeth 9 which will dig into the surfaces with which the washer is in contact so as to prevent relative motion between them. In the preferable form of the invention, a plurality of such engaging means is provided upon each face of the washer, each engaging means of one face, however, lying approximately midway between two adjacent engaging means upon the opposite face. The engaging means are separated sufficiently to allow the pressure exerted by the nut as it is turned down upon the washer to bend the washer into a sinuous curve, as shown clearly in Fig. 1. The washer is, of course, more or less elastic, and this bending of the washer by the pressure exerted upon the engaging means upon opposite faces of the washer causes the engaging means to grip the contacting surfaces with an elastic pressure so that each of such means may be effective. It is obvious that if the washer were not bent as described and one of the engaging means were slightly larger than the rest, it could not perform its function as it would be held away by the other engaging means from the surface which it was intended it should engage. The normally helical form of the washer is also helpful in causing the engaging means to grip the contacting surfaces with an elastic pressure.

While I prefer to provide a plurality of engaging means upon each face of the washer, it is obviously within the principle of the invention to provide a pair of engaging means upon one face and a single engaging means located upon the other face and opposite the space between the first two engaging means.

While I have shown the details of one form of my invention, I do not wish to be limited to such details as it is obvious that certain changes may be made within the scope of the appended claim without departing from the spirit of the invention; but—

Having described my invention, what I claim as new and desire to secure by Letters Patent is:

A lock washer comprising a split ring approximately in the form of one convolution of a helix, each side of said ring having a plurality of spaced raised portions in the form of ratchet teeth substantially radially disposed with respect to the axis of said ring, with the teeth of one side facing oppositely from the teeth of the other side, and the teeth of each side being located substantially midway of the corresponding spaces between the teeth of the other side.

JOHN F. HJORT.

Witnesses:
PENELOPE COMBERBACH,
NELLIE WHALEN.

Copies of this patent may be obtained for five cents each, by addressing the "Commissioner of Patents, Washington, D. C."